Jan. 20, 1948.                J. SCHNEIDER ET AL                2,434,814
              MACHINE FOR ELECTRIC WELDING OF DIAL FEET ONTO DIAL PLATES
                         Filed Feb. 27, 1945          2 Sheets-Sheet 1
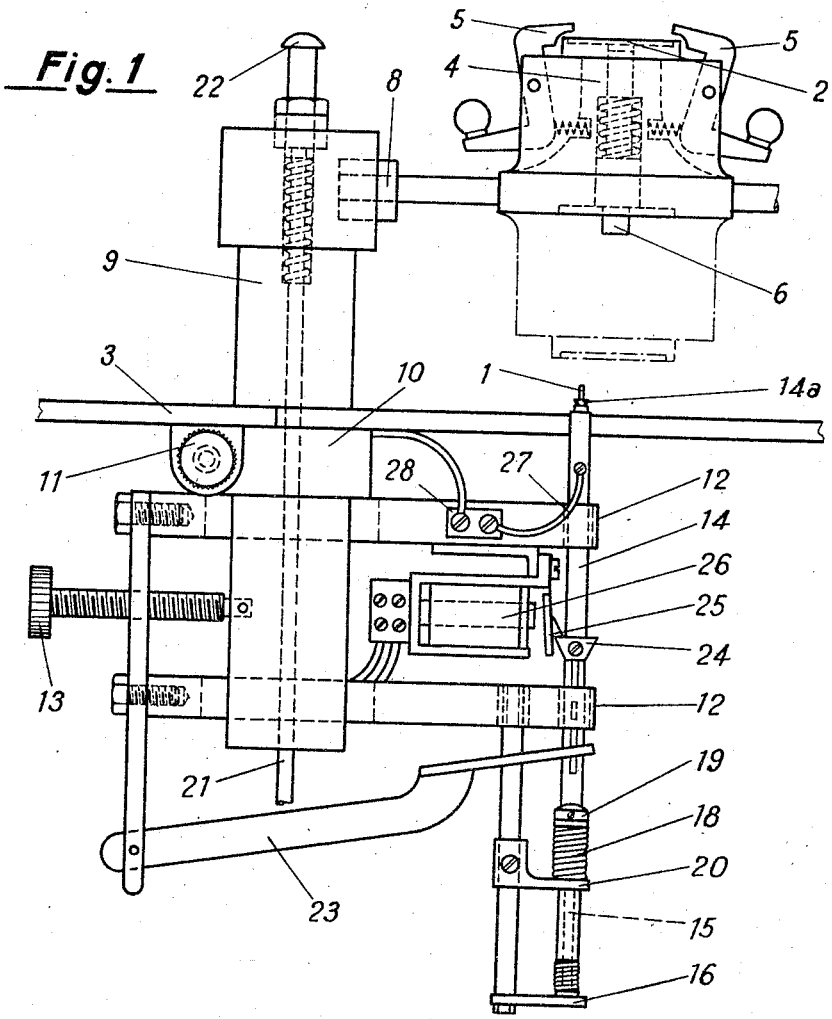
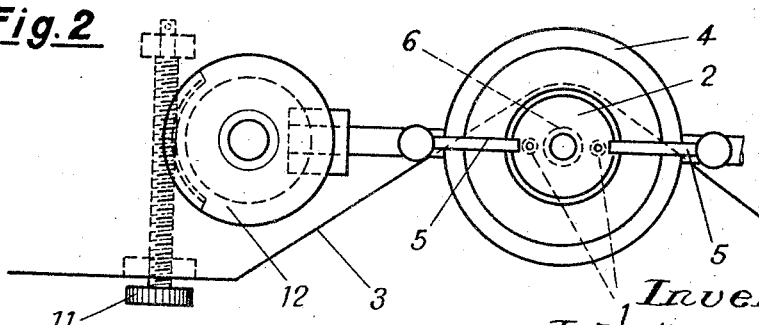
Inventors
J. Schneider
H. Schneider
By Glascock Downing Seiber Attys.

Inventors
J. Schneider
H. Schneider

Patented Jan. 20, 1948

2,434,814

UNITED STATES PATENT OFFICE 2,434,814

MACHINE FOR ELECTRIC WELDING OF DIAL FEET ONTO DIAL PLATES

Jules Schneider and Hans Schneider,
La Chaux de Fonds, Switzerland

Application February 27, 1945, Serial No. 579,940
In Switzerland January 28, 1944

Section 1, Public Law 690, August 8, 1946.
Patent expires January 28, 1964

3 Claims. (Cl. 219—8)

The present invention refers to a machine for electric welding of dial feet onto a dial plate. This machine is characterized by a table intended to receive the dial plate, and by two percussion electrodes intended to receive the feet to be welded onto the dial plate fixed on the table, each electrode being adapted to be energised by means of an electric condenser.

The attached drawing shows by way of example an embodiment of the invention.

Fig. 1 is a partial elevation view.

Fig. 2 is a partial plan view corresponding to Fig. 1.

Figure 3:
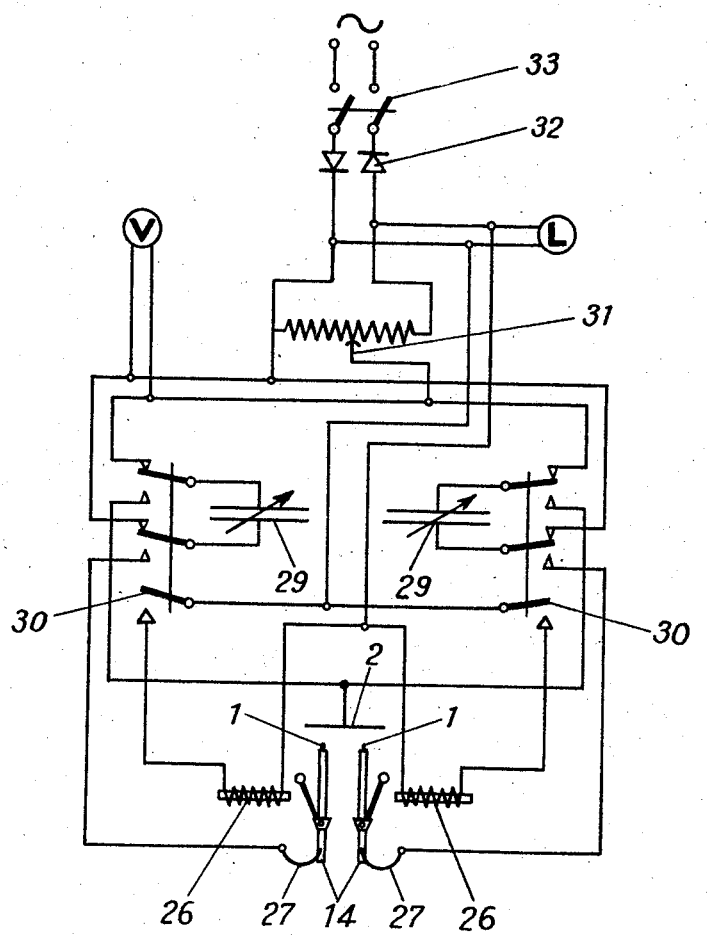
Fig. 3 shows the theoretical wiring diagram.

In the embodiment represented, the machine is intended for welding two feet 1 onto a dial plate 2. The machine is mounted in a casing the upper plate 3 of which is partly represented. An aperture provided in this plate and in the front wall gives access to the mechanism.

The dial plate 2 is carried by a clutch 4 comprising two clamps 5 and one release finger 6. This clutch is mounted on a horizontal shaft 7 adapted to rotate in two bearings 8. The latter are arranged in two vertical columns 9 placed symmetrically in relation with the clutch 4 and preferably provided with markings (not shown) indicating the two positions occupied by the clutch when turned with the shaft 7, such positions being represented in full and dotted lines in Fig. 1.

The columns 9 are mounted rotatably in the upper plate 3 of the casing of the machine. A ring with a helical tooth sector 10 and a worm screw 11a with milled head 11 enable varying the angular setting of these columns.

Two transverse arms 12 can slide in the lower part of the columns under the control of an adjusting screw 13 which has also a milled head. At their end these arms carry a vertical sliding rod 14 insulated electrically from the mass of the machine and at the top of which is provided a cylindrical chuck 14a intended to receive a foot 1 to be welded onto the dial plate 2. This rod is hollow throughout its whole length, and receives a control needle 15 of the chuck ensuring its automatic release as soon as the rod 14 is lowered, the needle 15 engaging a fixed stop 16.

The rods 14 carry a spring 18 bearing at one end on a ring 19 dependent at the rod and on the other end on an adjustable stop 20 permitting the tension of the spring to be varied.

The columns 9 carry a push-button 22 the lower end 21 of which acts on a lever 23 bearing on the ring 19 of the rods 14 whereby they may be restored to their initial position. A stop 24 cooperating with the movable armature 25 of an electro-magnet 26 retains the rod 14 in its initial position as long as the electro-magnet does not receive any current.

The rods 14 are insulated from the mass and connected by a flexible lead 27 and a terminal block 28 to the electric circuit of the machine.

As shown on the theoretical wiring diagram of Fig. 3 the machine contains also two variable condensers 29, two control keys for connecting these condensers either to a current supply or to the pieces to be welded, a voltmeter V and a signal lamp L, a potentiometer 31, a rectifier 32 and a main switch 33.

The machine operates as follows:

The operator places the dial plate on the clutch 4, on which it is maintained by the clamps 5. Then the operator turns the clutch into its lower position represented in dotted lines, after having set a foot 1 to be welded into each one of the cylindrical chucks 14a.

The stop 20 is adjustable, so as to enable proportioning the tension of the spring to the size of the foot to be welded. The potentiometer is adjusted by observing the voltmeter V and by choosing the tension, as well as the capacity of the variable condensers 29, according to the size of the pieces to be welded. The condensers are loaded in the initial position of the machine.

For welding the two feet 1 onto the dial plate 2, both keys 30 are pressed. The loaded condensers are at once connected to the dial plate, on one hand, and to each one of the feet to be welded, on the other hand. Immediately afterwards, the electro-magnets 26 are energised actuating the armature 25 and releasing the rods 14, which rise under the action of their spring 18.

The feet 1 are applied onto the dial plate and the discharge spark welds them instantaneously and very neatly.

The operator then presses the push-buttons 22 in order to depress the rods 14 into their initial position and reloads the machine for the next cycle of operations.

Optionally, the clutch can be mounted on two slides at right angle. Similarly, the rod or rods 14 can be mounted on a fixed support, or on a support movable on two slides at right angle.

What we claim is:

1. In a machine for electric welding of dial feet onto a dial plate, comprising a work-table carrying a dial plate holder and mounted on the machine frame, two axially slidable electrodes placed at right angles to the plane of the work-table and carrying at their near end a dial foot check, and two condensers with change-over switch for successive connection first with a current supply and then with the work-table and the respective electrode, the special feature that the work-table is mounted rotatively on a shaft placed at right angles to the axes of the electrodes, and that the rotation of the table is limited to one turn-over of 180 degrees.

2. In a machine for electric welding of dial feet onto a dial plate, comprising a work-table carrying a dial plate holder and mounted on the machine frame, two axially slidable electrodes placed at right angles to the plane of the work-table and carrying at their near end a dial foot chuck, and two condensers with change-over switch for successive connection first with a current supply and then with the work-table and the respective electrode, the special feature that the electrodes present a shoulder held up on the armature of an electromagnet against the action of a percussion spring of the electrode, the latter containing a chuck release needle abutting on a fixed stop at its far end when said electrode is reset after percussion.

3. In a machine for electric welding of dial feet onto a dial plate, comprising a work-table carrying a dial plate holder and mounted on the machine frame, two axially slidable electrodes placed at right angles to the plane of the work-table and carrying at their near end a dial foot chuck, and two condensers with change-over switch for successive connection first with a current supply and then with the work-table and the respective electrode, the special feature that the electrodes are mounted on a support adapted to slide at right angles with the electrodes and to rotate around an axle parallel with said electrodes, whereby the latter can be moved transversely and longitudinally in a plane at right angles with the electrodes.

JULES SCHNEIDER.
HANS SCHNEIDER.

REFERENCES CITED

The following references are of record in the file of this patent:

UNITED STATES PATENTS

| Number | Name | Date |
| --- | --- | --- |
| 1,327,814 | Fortescue | Jan. 13, 1920 |
| 1,582,043 | Hilberry | Apr. 27, 1926 |
| 2,005,752 | Pfanstiehl | June 25, 1935 |
| 2,010,954 | Heineman | Aug. 13, 1935 |

FOREIGN PATENTS

| Number | Country | Date |
| --- | --- | --- |
| 142,014 | Switzerland | Mar. 17, 1930 |